(12) United States Patent
Basu

(10) Patent No.: US 8,180,139 B2
(45) Date of Patent: May 15, 2012

(54) METHOD AND SYSTEM FOR INSPECTION OF CONTAINERS

(75) Inventor: Samit K. Basu, Fremont, CA (US)

(73) Assignee: Morpho Detection, Inc., Newark, CA (US)

( * ) Notice: Subject to any disclaimer, the term of this patent is extended or adjusted under 35 U.S.C. 154(b) by 601 days.

(21) Appl. No.: 12/411,918

(22) Filed: Mar. 26, 2009

(65) Prior Publication Data

US 2010/0246937 A1 Sep. 30, 2010

(51) Int. Cl.
*G06K 9/00* (2006.01)
*G01N 23/04* (2006.01)

(52) U.S. Cl. ............. 382/141; 382/154; 378/57

(58) Field of Classification Search .......... 382/131, 382/141, 154; 378/57, 58
See application file for complete search history.

(56) References Cited

U.S. PATENT DOCUMENTS

| | | | |
|---|---|---|---|
| 5,182,764 A | | 1/1993 | Peschmann |
| 5,319,547 A | * | 6/1994 | Krug et al. .......... 705/13 |
| 7,440,544 B2 | * | 10/2008 | Scheinman et al. .......... 378/57 |
| 2005/0249416 A1 | | 11/2005 | Leue et al. |
| 2008/0175456 A1 | | 7/2008 | Ioannou |
| 2011/0227910 A1 | * | 9/2011 | Ying et al. .......... 345/419 |

OTHER PUBLICATIONS

Zhengrong Ying et al: "Dual Energy Volumetric X-ray Tomographic Sensor for Luggage Screening", Proceedings of the 2007 IEEE Sensors Applications Symposium, IEEE-Piscataway, NJ, USA, Feb. 1, 2007, pp. 1-6, XP31180438, ISBN: 987-1-4244-0677-7.
EP Application No. 10 156 969.7 EP Search Report and Opinion dated Jun. 15, 2010, 8 pages.

* cited by examiner

*Primary Examiner* — John Strege
(74) *Attorney, Agent, or Firm* — Armstrong Teasdale LLP

(57) ABSTRACT

A method and system for producing images of at least one object of interest in a container. The method includes receiving three-dimensional volumetric scan data from a scan of the container, reconstructing a three-dimensional representation of the container from the three-dimensional volumetric scan data, and inspecting the three-dimensional representation to detect the at least one object of interest within the container. The method also includes re-projecting a two-dimensional image from one of the three-dimensional volumetric scan data and the three-dimensional representation, and identifying a first plurality of image elements in the two-dimensional image corresponding to a location of the at least one object of interest. The method further includes outputting the two-dimensional image with the first plurality of image elements highlighted.

20 Claims, 6 Drawing Sheets

METHOD AND SYSTEM FOR INSPECTION OF CONTAINERS

BACKGROUND OF THE INVENTION

1. Field of the Invention

The embodiments described herein relate generally to inspection of containers and, more particularly, to producing images of at least one object of interest in a container to facilitate detecting objects within the container.

2. Description of Prior/Related Art

At least some known inspection systems construct an image of a container and analyze the image to detect explosives, drugs, weapons, and/or other contraband objects within the container. Some known inspection systems, including some known carry-on and checked baggage inspection systems, use a computed tomography (CT) scanner to produce images of the interior of the container. In some known CT systems, an X-ray fan beam source and a detector array are disposed opposite each other in a gantry. The gantry is rotated around the container such that the angle at which the X-ray fan beam intersects the container constantly changes. The detector array acquires a "view," or group of X-ray attenuation measurements, at each of multiple gantry angles. A "scan" of the object includes a set of views made at different gantry angles, or view angles, during one revolution of the X-ray source and detector about the container.

At least some known CT systems use three-dimensional (3-D) volumetric scanners to acquire CT scan data representing an entire target volume. One example of a 3-D volumetric CT scanner is a helical CT scanner, in which the container is continually moved substantially parallel to the axis of gantry rotation while the X-ray attenuation data is being acquired, such that the path of the X-ray source defines a helix with respect to the container. Three-dimensional representations of the entire volume scanned by a 3-D volumetric scanner can be reconstructed using well known tomographic reconstruction algorithms, for example, direct Fourier or filtered backprojection methods.

At least some known inspection systems also include a prescanner to produce a two-dimensional scan projection (SP) image of the container for presentation to an operator for inspection. Some known prescanners operate by moving the container under a fan beam of X-rays from a stationary X-ray source. X-ray intensities, after being attenuated by the container and the objects within it, are measured by a stationary array of detectors. Such prescanners may use a separate stationary X-ray source and detector array, or they may employ a primary 3-D volumetric CT scanner in a stationary prescanner mode to produce two-dimensional SP images before conducting a helical scan. Inspection system operators typically receive extensive training, and/or have accumulated extensive experience, in recognizing certain types of objects in a two-dimensional SP image. As a result, for at least some inspection system operators, inspection of an SP image, rather than of a full three-dimensional representation from the CT scan, increases a speed and accuracy of the identification of certain types of objects.

The use of a dedicated prescanner also may provide other benefits. For example, at least some known prescanners provide dual energy scanning of the container. Collecting data for a low-energy scan and a high-energy scan allows such inspection systems to reconstruct, for example, a density image and/or atomic number image of the contents of the container to facilitate identification of objects and materials in the container.

Unfortunately, the use of a prescanner also may increase a cost and complexity of the inspection system, for example by requiring a separate stationary X-ray source and detector array, or by requiring additional hardware and software in the 3-D volumetric CT scanner to support a stationary prescanner mode. The time required to conduct the prescan also adds to the overall time required for scanning a container. Some known inspection systems avoid these potential drawbacks by forgoing a prescanner, instead re-projecting the 3-D volumetric CT scan data into two-dimensional images similar to SP images from a prescanner. However, in at least some such systems, a resolution of the re-projected two-dimensional SP-type images is less than a resolution of the SP images produced by a prescanner, and/or less than a resolution of the original three-dimensional CT representation. This reduced resolution may cause objects of interest identifiable from the three-dimensional CT scan data, such as thin wires, not to be visible in the re-projected two-dimensional image.

For example, FIG. 3 is a right perspective view of certain representative objects of interest that may lie within a container 18. In FIG. 3, container 18 and any non-numbered objects within container 18 are rendered transparent for ease of viewing. Container 18 might include objects of interest such as, for example but not by way of limitation, a thin wire 60 between two otherwise non-descript objects 61 and 62, a plastic explosive material 64, and/or overlapping objects 66 and 68.

FIG. 4 shows a prior art two-dimensional SP-type image that might be obtained using a suitable method for re-projecting an SP-type image from data obtained from a 3-D volumetric scan of container 18 containing representative objects of interest 60, 64, 66 and 68, as shown in FIG. 3. Alternatively, an image such as that illustrated in FIG. 4 might be obtained using a suitable method for re-projecting an SP-type image from a three-dimensional representation of container 18 that was in turn generated from 3-D volumetric scan data from a scan of container 18.

With reference to FIGS. 3 and 4, otherwise non-descript objects 61 and 62 appear in the SP-type image as disconnected areas 71 and 72, with no indication of thin wire 60, although thin wire 60 would have been detected in the inspection of the three-dimensional image representation. Similarly, plastic explosive 64 appears as a non-descript region 74 in the SP-type image, although in certain embodiments a multiple-energy scan by inspection system 10 would have detected a material comprising plastic explosive 64 as a material of interest. In addition, overlapping objects 66 and 68 appear as a single unified region 76 in the SP-type image, although the presence of separate objects 66 and 68 would have been detected in the inspection of the three-dimensional image representation.

BRIEF SUMMARY OF THE INVENTION

In one aspect, a method for producing images of at least one object of interest in a container is provided. The method includes receiving three-dimensional volumetric scan data from a scan of the container, reconstructing a three-dimensional representation of the container from the three-dimensional volumetric scan data, and inspecting the three-dimensional representation to detect the at least one object of interest within the container. The method also includes re-projecting a two-dimensional image from one of the three-dimensional volumetric scan data and the three-dimensional representation, and identifying a first plurality of image elements in the two-dimensional image corresponding to a location of the at least one object of interest. The method further includes outputting the two-dimensional image with the first plurality of image elements highlighted.

In another aspect, an inspection system for detecting at least one object of interest within a container is provided. The system includes a processor configured to receive three-dimensional volumetric scan data from a scan of the container, reconstruct a three-dimensional representation of the container from the three-dimensional volumetric scan data, and inspect the three-dimensional representation to detect the at least one object of interest within the container. The processor is also configured to re-project a two-dimensional image from one of the three-dimensional volumetric scan data and the three-dimensional representation, and identify a first plurality of image elements in the two-dimensional image corresponding to a location of the at least one object of interest. The processor is further configured to output the two-dimensional image with the first plurality of image elements highlighted.

In still another aspect, a computer program embodied on a computer-readable medium is provided. The computer program includes a code segment that configures a processor to receive three-dimensional volumetric scan data from a scan of the container, reconstruct a three-dimensional representation of the container from the three-dimensional volumetric scan data, and inspect the three-dimensional representation to detect the at least one object of interest within the container. The code segment also configures the processor to re-project a two-dimensional image from one of the three-dimensional volumetric scan data and the three-dimensional representation, and identify a first plurality of image elements in the two-dimensional image corresponding to a location of the at least one object of interest. The code segment further configures the processor to output the two-dimensional image with the first plurality of image elements highlighted.

BRIEF DESCRIPTION OF THE DRAWINGS

FIG. 1 is a right perspective view of an exemplary inspection system.

FIG. 2 is a block diagram of an exemplary inspection system.

FIG. 3 is a right perspective view of certain representative objects of interest that may lie within a container to be scanned by the exemplary inspection system of FIGS. 1 and 2.

FIG. 4 shows a prior art two-dimensional SP-type image that might be obtained by re-projecting 3-D volumetric scan data obtained by a scan of the container shown in FIG. 3 using the exemplary inspection system shown in FIGS. 1 and 2.

FIG. 5 shows an exemplary embodiment of the two-dimensional SP-type image shown in FIG. 4 with the representative objects of interest shown in FIG. 3 highlighted for inspection.

FIG. 6 is a flowchart illustrating an exemplary embodiment of a method for producing images, such as the exemplary embodiment of an SP-type image in FIG. 5, of at least one object of interest in a container.

DETAILED DESCRIPTION OF THE INVENTION

At least one embodiment of the present invention is described below with reference to a system for inspecting luggage. However, it should be apparent to those skilled in the art and guided by the teachings herein provided that embodiments of the invention likewise are applicable to any suitable system for scanning cargo containers including, without limitation, crates, boxes, drums, containers, baggage, and suitcases, transported by water, land, and/or air, as well as other containers and/or objects.

Moreover, although embodiments of the present invention are described below with reference to a system incorporating an X-ray computed tomography (CT) scanning system for inspecting luggage, it should apparent to those skilled in the art and guided by the teachings herein provided that any suitable scanning radiation source including, without limitation, neutrons or gamma rays, may be used in alternative embodiments. Further, it should be apparent to those skilled in the art and guided by the teachings herein provided that any scanning system may be used that produces a sufficient number of image elements to enable the functionality of the inspection system described herein. The term "image element" refers to an element, such as a pixel or voxel, within image data.

Figure 1:
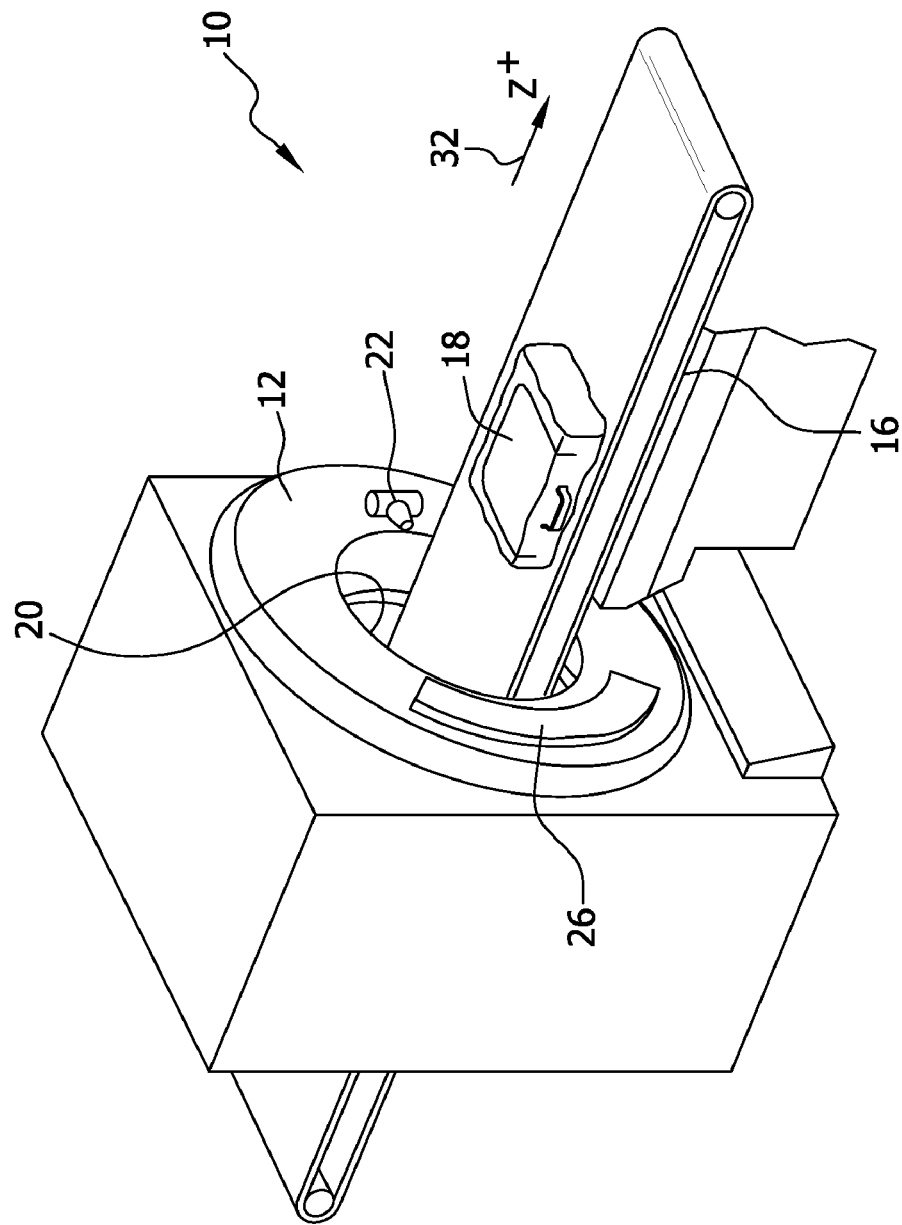
FIGS. 1-6 show exemplary embodiments of the systems and methods described herein.
Figure 2:
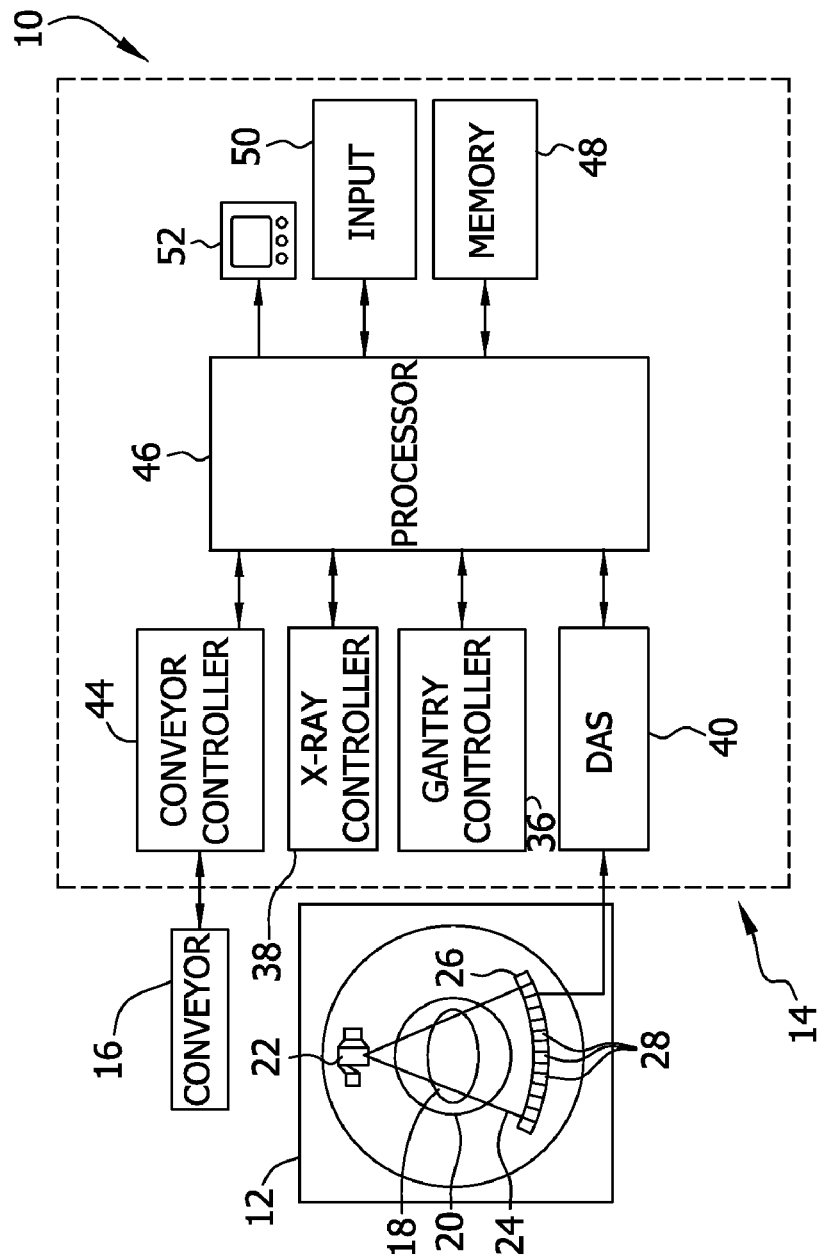

An exemplary embodiment of an inspection system 10 is shown in FIGS. 1 and 2. In the exemplary embodiment, inspection system 10 is a 3-D volumetric scanner including a gantry 12, a control system 14, and a motorized conveyor belt 16 for positioning a container, for example, but not by way of limitation, a piece of luggage such as container 18 shown in FIG. 3, in an opening 20 defined in gantry 12. Gantry 12 includes an X-ray source 22 that projects a fan beam of X-rays 24 toward a detector array 26 on an opposite side of gantry 12. Detector array 26 includes a plurality of detector elements 28. Each detector element 28 is a radiation detector that produces a signal having a magnitude that represents an intensity of an attenuated X-ray beam after an X-ray beam has passed through container 18. In certain embodiments, detector elements 28 have energy-discriminating capability. During a helical scan that acquires X-ray projection data, gantry 12, including X-ray source 22 and detector array 26, rotates around container 18 within a plane about an axis of rotation substantially parallel to a z-direction 32, while container 18 is moved through gantry 12 in z-direction 32.

Referring further to FIG. 2, in the exemplary embodiment, gantry 12 and X-ray source 22 are controlled by control system 14, which includes a gantry controller 36, an X-ray controller 38, a data acquisition system (DAS) 40, a conveyor controller 44, a processor 46, a memory device 48, an input device 50, and a display 52. Although elements of control system 14 are represented in FIG. 2 as separate components, in certain embodiments various elements of control system 14 may be jointly implemented in a single physical component, or each may be further subdivided into additional physical components. Operable communication between the various system elements is depicted in FIG. 2 by arrowhead lines, which illustrate either signal communication or mechanical operation, depending on the system element involved. Moreover, operable communication among the various system elements may be obtained through a hardwired or a wireless arrangement, or a combination thereof. For example, in the exemplary embodiment, gantry controller 36 controls the rotational speed and position of gantry 12, while X-ray controller 38 provides power and timing signals to X-ray source 22, and data acquisition system 40 acquires analog data from detector elements 28 and converts the data to digital form for subsequent processing.

Further in the exemplary embodiment shown in FIGS. 1 and 2, processor 46 is in operable communication with gantry controller 36, X-ray controller 38, and conveyor controller 44. For example, processor 46 receives information from, and sends control signals to, gantry controller 36, X-ray controller 38, and conveyor controller 44 to facilitate operation of inspection system 10. As used herein, the term "processor" is not limited to only integrated circuits referred to in the art as a processor, but broadly refers to a computer, a microcontroller, a microcomputer, a programmable logic controller, an application-specific integrated circuit and/or any other programmable circuit. In certain embodiments, processor 46 refers to multiple individual processors, whether operating in concert or independently of each other.

Processor 46 also is in operable communication with data acquisition system 40. For example, processor 46 sends commands and operational parameters to, and receives digitized X-ray projection data from, data acquisition system 40. In the exemplary embodiment, processor 46 is configured to generate one or more images of container 18 and its contents and to process the produced image(s) to automatically inspect, and/or facilitate an inspection by an operator, of the contents of container 18. The term "contents" as used herein refers to any object and/or material contained within container 18 and may include contraband. For example, processor 46 performs an image reconstruction process on the projection data received from data acquisition system 40 using any suitable image reconstruction algorithm that allows inspection system 10 to function as described herein, and automatically inspects the reconstructed image data using any suitable inspection algorithm that allows inspection system 10 to function as described herein.

In the exemplary embodiment, processor 46 also is in operable communication with memory device 48, input device 50, and display 52. Memory device 48 may be, but is not limited to, a random access memory (RAM), a read-only memory (ROM), a magnetic or optical drive (not shown), and/or any suitable storage device that enables inspection system 10 to function as described herein. Input device 50 may be, but is not limited to, a mouse, a keyboard, and/or any suitable input device that enables inspection system 10 to function as described herein. Display device 52 may be, but is not limited to, a monitor, a cathode ray tube (CRT), a liquid crystal display (LCD), and/or any suitable output device that enables inspection system 10 to function as described herein.

In certain embodiments, inspection system 10 acquires multiple-energy X-ray attenuation data for container 18. For example, but not by way of limitation, inspection system 10 may include detector elements 28 having energy discrimination capability, allowing data acquisition system 40 to acquire distinct X-ray attenuation data for two or more radiation energy levels. In certain embodiments, processor 46 uses the multiple-energy attenuation data collected by data acquisition system 40 not only to produce CT images, but also to derive density and/or atomic number information for the contents of container 18 using any suitable algorithm. The density and/or atomic number information further facilitates identifying a material within container 18.

Figure 3:
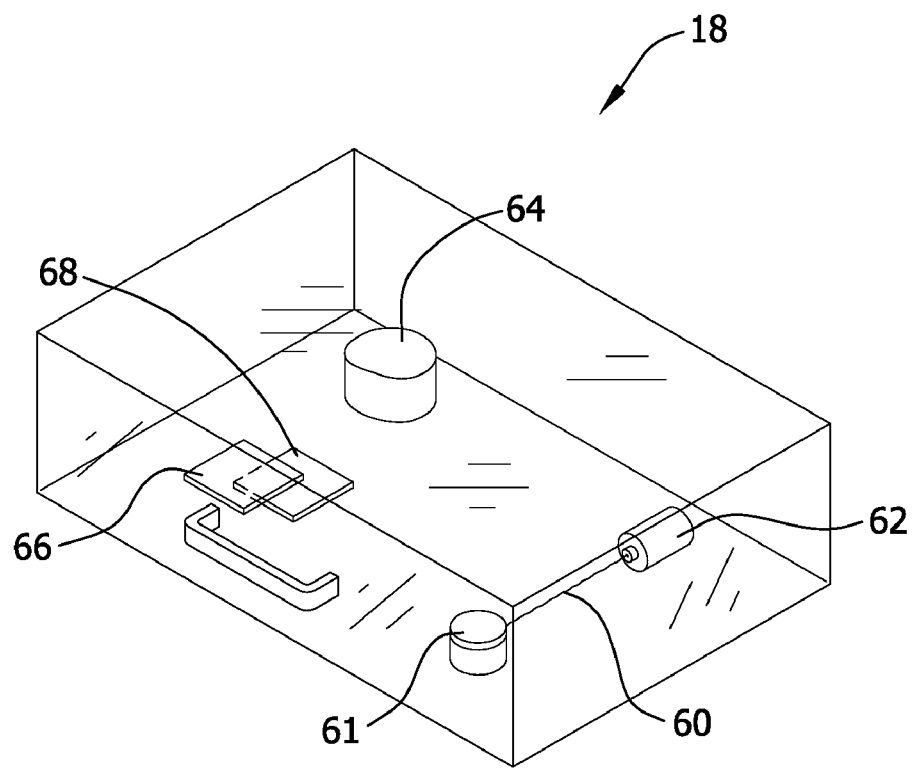

Inspection system 10 (shown in FIGS. 1 and 2) may be used to perform a 3-D volumetric CT scan of container 18 to generate a three-dimensional representation of the contents of container 18, and to apply an inspection algorithm to the three-dimensional representation to detect objects of interest within container 18, such as representative objects of interest 60, 64, 66 and 68 shown in FIG. 3. It may be advantageous for processor 46 also to re-project the 3-D volumetric CT scan data or the three-dimensional representation into a two-dimensional SP-type image of the type shown in FIG. 4 for output to an operator, for example immediately via display device 52 or via storage in memory 48.

Figure 4:
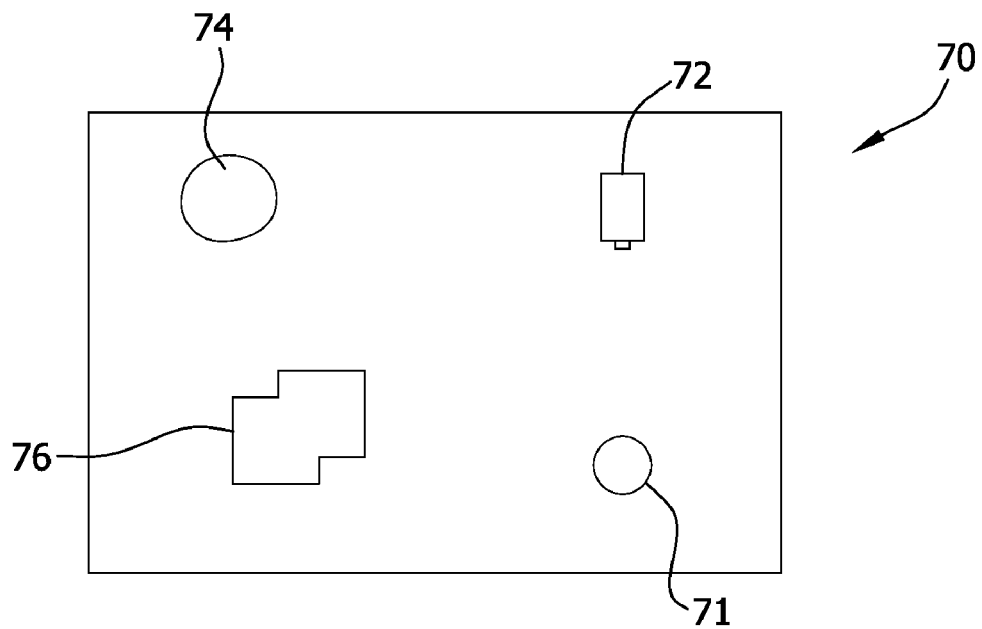
Figure 5:
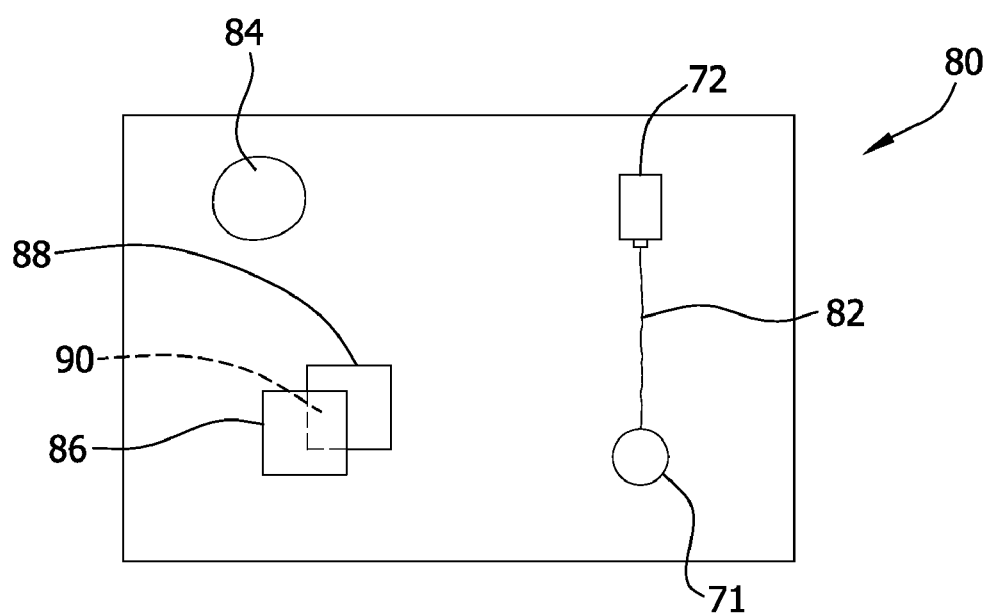

FIG. 5 shows an exemplary embodiment of the two-dimensional SP-type image of FIG. 4, but with the representative objects of interest 60, 64, 66 and 68 (as shown in FIG. 3) that were detectable in the three-dimensional representation and/or multiple energy scan now highlighted for inspection. For example, processor 46 (shown in FIG. 1) may use any suitable algorithm to identify the image elements, such as pixels, in the SP-type projection that correspond to the locations of representative objects of interest 60, 64, 66 and 68 detected by processor 46 from inspection of the three-dimensional representation of container 18.

With reference to FIGS. 3 and 5, representative objects of interest 60, 64, 66 and 68 are highlighted in FIG. 5 by, for example but not by way of limitation, adding false color to the image in FIG. 4 at appropriate locations. In certain embodiments, one or more representative objects of interest 60, 64, 66 and 68 are highlighted by using flashing or blinking display effects, or any suitable effect for providing visual emphasis, instead of, or in addition to, false color. In certain embodiments, the location of thin wire 60 as detected in the three-dimensional representation is indicated by, for example, a bright orange false color region 82 in the re-projected SP-type image of FIG. 5. Similarly, in certain embodiments, the plastic explosive 64 identified in certain embodiments as a material of interest by a multiple-energy 3-D volumetric scan is indicated by, for example, a bright red false color region 84 in the re-projected SP-type image of FIG. 5. Moreover, in the exemplary embodiment, separate overlapping objects 66 and 68 detected in the three-dimensional representation are indicated by, for example, a first false-color region 86 corresponding to locations of object 66 where no overlap with object 68 occurs, a second false-color region 88 corresponding to locations of object 68 where no overlap with object 66 occurs, and a third false-color region 90 corresponding to locations where object 66 overlaps with object 68. In certain embodiments, the false color used in the third false-color region 90 includes a cross-hatch of the false colors used in first false-color region 86 and second false-color region 88.

Figure 6:
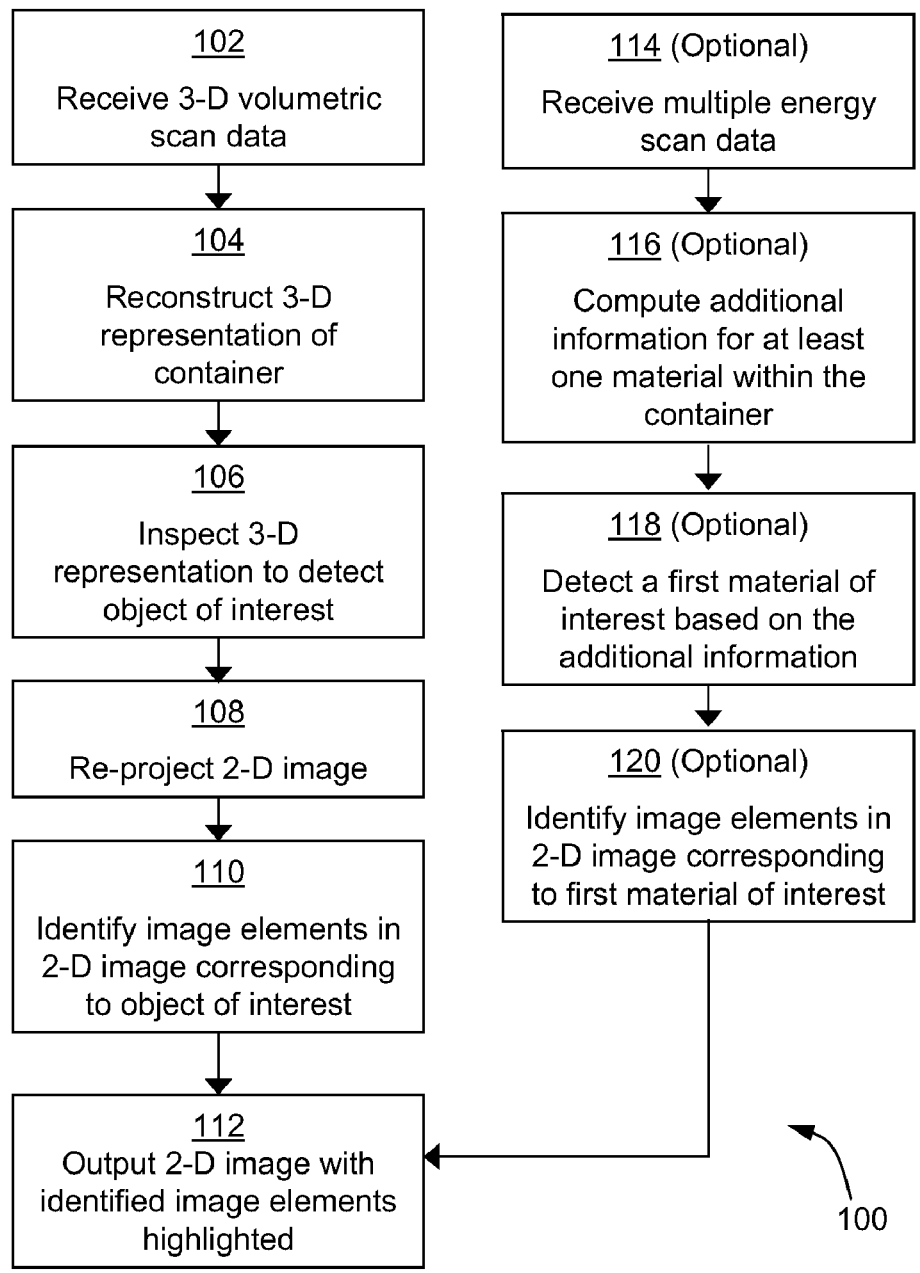

FIG. 6 is a flowchart illustrating an exemplary embodiment of a method 100 for producing images, such as the exemplary embodiment of an SP-type image in FIG. 5, of at least one object of interest in a container. In the exemplary embodiment, method 100 is performed using a system such as inspection system 10 (shown in FIGS. 1 and 2) to scan a container such as container 18 (shown in FIGS. 1-3). However, method 100 is not limited to implementation on inspection system 10, but rather method 100 may be embodied on any suitable system, such as a separate system that receives any suitable scan data. Moreover, method 100 may be embodied on a computer readable medium as a computer program, and/or implemented and/or embodied by any other suitable means. The computer program may include a code segment that, when executed by a processor, configures the processor to perform one or more of the functions of method 100.

In the exemplary embodiment, processor 46 of inspection system 10 (shown in FIG. 2) receives 102 3-D volumetric scan data from a scan of container 18 and reconstructs 104 a three-dimensional representation of container 18. Processor 46 also inspects 106 the three-dimensional representation using any suitable inspection algorithm to detect at least one object of interest, such as thin wire 60 and/or overlapping objects 66 and 68 (shown in FIG. 3). Further in the exemplary embodiment, processor 46 re-projects 108, using any suitable method, a two-dimensional image from one of the 3-D volumetric scan data and the three-dimensional representation. Processor 46 also identifies 110 a first plurality of image elements, for example pixels, in the two-dimensional image corresponding to a location of the at least one object of interest. Processor 46 outputs 112 the two-dimensional image with the first plurality of image elements highlighted. For example, but not by way of limitation, processor 46 outputs 112 the two-dimensional image with the first plurality of image elements rendered in a false color.

In certain embodiments, processor 46 also receives 114 multiple energy scan data and computes 116 additional information, such as density and/or atomic number information, for at least one material within container 18 from the multiple energy scan, using any suitable algorithm. Processor 46 further detects 118 a first material of interest based on the additional information and identifies 120 a second plurality of image elements, for example pixels, in the two-dimensional image corresponding to a location of the first material of interest. In certain embodiments, the step of outputting 112 the two-dimensional image further includes outputting 112 the two-dimensional image with the second plurality of image elements highlighted. For example, but not by way of limitation, processor 46 outputs 112 the two-dimensional image with the second plurality of image elements rendered in a false color.

The above-described system and method for inspection of containers facilitate increasing an accuracy of, and decreasing a time and cost required for, the detection of objects, including contraband, within containers. More specifically, the embodiments described herein facilitate the display in two-dimensional SP-type images of information regarding objects and materials that typically would not be visible in SP images created from two-dimensional re-projections of 3-D volumetric scan data or three-dimensional representations, while avoiding an added time and cost associated with the use of a prescanner. A technical effect of the embodiments described herein is to provide useful information available from a 3-D volumetric scan within a two-dimensional SP image format that is advantageously familiar and useful to a typical inspection system operator.

Exemplary embodiments of methods and systems for inspection of containers are described above in detail. The methods and systems are not limited to the specific embodiments described herein, but rather, components of systems and/or steps of the methods may be utilized independently and separately from other components and/or steps described herein. For example, the methods may also be used in combination with other imaging systems and methods, and are not limited to practice with only the inspection systems as described herein. Rather, the exemplary embodiments can be implemented and utilized in connection with many other inspection and/or detection applications.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for producing images of at least one object of interest in a container, said method comprising:
   receiving three-dimensional volumetric scan data and energy information from a scan of the container;
   reconstructing a three-dimensional representation of the container from the three-dimensional volumetric scan data;
   detecting the at least one object of interest within the container by inspecting the three-dimensional representation;
   re-projecting a two-dimensional image from one of the three-dimensional volumetric scan data and the three-dimensional representation;
   identifying a first plurality of image elements in the two-dimensional image corresponding to a location of the at least one object of interest; and
   outputting the two-dimensional image with the first plurality of image elements highlighted based on the energy information and at least one of the three-dimensional volumetric scan data and the three-dimensional representation.

2. A method in accordance with claim 1, wherein said inspecting the three-dimensional representation to detect the at least one object of interest comprises inspecting the three-dimensional representation to detect at least one of a thin wire and a plurality of overlapping objects.

3. A method in accordance with claim 1, wherein said outputting the two-dimensional image with the first plurality of image elements highlighted comprises outputting the two-dimensional image with the first plurality of image elements rendered in a false color.

4. A method in accordance with claim 1, wherein the at least one object of interest comprises a plurality of overlapping objects, and said outputting the two-dimensional image with the first plurality of image elements highlighted comprises outputting the two-dimensional image with a first false-color region corresponding to a location of a first object of the plurality of overlapping objects where no overlap with a second object of the plurality of overlapping objects occurs, a second false-color region corresponding to a location of the second object where no overlap with the first object occurs, and a third false-color region corresponding to a location where the first object overlaps with the second object.

5. A method in accordance with claim 1, further comprising:
   receiving multiple energy scan data from the scan of the container as the energy information;
   computing additional information for at least one material within the container from the multiple energy scan data;
   detecting a first material of interest within the container based on the additional information;
   identifying a second plurality of image elements in the two-dimensional image corresponding to a location of the first material of interest; and
   outputting an energy-discriminated two-dimensional image with the second plurality of image elements highlighted based on at least the energy information.

6. A method in accordance with claim 5, wherein said computing additional information comprises computing at least one of a density and an effective atomic number of the first material of interest.

7. A method in accordance with claim 5, wherein said outputting the two-dimensional image with the second plurality of image elements highlighted comprises outputting the two-dimensional image with the second plurality of image elements rendered in a false color.

8. An inspection system for detecting at least one object of interest within a container, said inspection system comprising a processor configured to:
   receive three-dimensional volumetric scan data and energy information from a scan of the container;
   reconstruct a three-dimensional representation of the container from the three-dimensional volumetric scan data;

detect the at least one object of interest within the container by inspecting the three-dimensional representation;

re-project a two-dimensional image from one of the 3-D volumetric scan data and the three-dimensional representation;

identify a first plurality of image elements in the two-dimensional image corresponding to a location of the at least one object of interest; and output the two-dimensional image with the first plurality of image elements highlighted based on the energy information and at least one of the three-dimensional volumetric scan data and the three-dimensional representation.

9. An inspection system in accordance with claim 8, wherein said processor is further configured to inspect the three-dimensional representation to detect at least one of a thin wire and a plurality of overlapping objects.

10. An inspection system in accordance with claim 8, wherein said processor is further configured to output the two-dimensional image with the first plurality of image elements rendered in a false color.

11. An inspection system in accordance with claim 8, wherein the at least one object of interest comprises a plurality of overlapping objects, said processor is further configured to output the two-dimensional image with a first false-color region corresponding to a location of a first object of the plurality of overlapping objects where no overlap with a second object of the plurality of overlapping objects occurs, a second false-color region corresponding to a location of the second object where no overlap with the first object occurs, and a third false-color region corresponding to a location where the first object overlaps with the second object.

12. An inspection system in accordance with claim 8, wherein said processor is further configured to:

receive multiple energy scan data from the scan of the container as the energy information;

compute additional information for at least one material within the container from the multiple energy scan data;

detect a first material of interest within the container based on the additional information;

identify a second plurality of image elements in the two-dimensional image corresponding to a location of the first material of interest; and output an energy-discriminated two-dimensional image with the second plurality of image elements highlighted based on at least the energy information.

13. An inspection system in accordance with claim 12, wherein said processor is further configured to compute at least one of a density and an effective atomic number of the first material of interest.

14. An inspection system in accordance with claim 12, wherein said processor is further configured to output the two-dimensional image with the second plurality of image elements rendered in a false color.

15. A computer program embodied on a non-transitory computer-readable medium, said computer program comprising a code segment that configures a processor to:

receive three-dimensional volumetric scan data and energy information from a scan of the container;

reconstruct a three-dimensional representation of the container from the three-dimensional volumetric scan data;

detect the at least one object of interest within the container by inspecting the three-dimensional representation;

re-project a two-dimensional image from one of the three-dimensional volumetric scan data and the three-dimensional representation;

identify a first plurality of image elements in the two-dimensional image corresponding to a location of the at least one object of interest; and output the two-dimensional image with the first plurality of image elements highlighted based on the energy information and at least one of the three-dimensional volumetric scan data and the three-dimensional representation.

16. A computer program in accordance with claim 15, wherein the code segment further configures the processor to inspect the three-dimensional representation to detect at least one of a thin wire and a plurality of overlapping objects.

17. A computer program in accordance with claim 15, wherein the code segment further configures the processor to output the two-dimensional image with the first plurality of image elements rendered in a false color.

18. A computer program in accordance with claim 15, wherein the at least one object of interest comprises a plurality of overlapping objects, and the code segment further configures the processor to output the two-dimensional image with a first false-color region corresponding to a location of a first object of the plurality of overlapping objects where no overlap with a second object of the plurality of overlapping objects occurs, a second false-color region corresponding to a location of the second object where no overlap with the first object occurs, and a third false-color region corresponding to a location where the first object overlaps with the second object.

19. A computer program in accordance with claim 15, wherein the code segment further configures the processor to:

receive multiple energy scan data from the scan of the container as the energy information;

compute additional information for at least one material within the container from the multiple energy scan data;

detect a first material of interest within the container based on the additional information;

identify a second plurality of image elements in the two-dimensional image corresponding to a location of the first material of interest; and output an energy-discriminated two-dimensional image with the second plurality of image elements highlighted based on at least the energy information.

20. A computer program in accordance with claim 19, wherein the code segment further configures the processor to compute at least one of a density and an effective atomic number of the first material of interest.

* * * * *